(12) United States Patent
Wu et al.

(10) Patent No.: US 7,951,289 B2
(45) Date of Patent: May 31, 2011

(54) CONTINUOUS STEAM PYROLYSIS METHOD

(75) Inventors: Chun-Yao Wu, Gangshan Township (TW); Kalitko Uladzimir, Gangshan Township (TW)

(73) Assignee: Enrestec, Inc., Gangshan Township (TW)

( * ) Notice: Subject to any disclaimer, the term of this patent is extended or adjusted under 35 U.S.C. 154(b) by 317 days.

(21) Appl. No.: 12/277,647

(22) Filed: Nov. 25, 2008

(65) Prior Publication Data

US 2009/0250378 A1    Oct. 8, 2009

(30) Foreign Application Priority Data

Apr. 7, 2008  (TW) ................................ 97112505 A

(51) Int. Cl.
*C10G 9/14* (2006.01)
(52) U.S. Cl. ...................................................... 208/132
(58) Field of Classification Search .................... 208/132
See application file for complete search history.

(56) References Cited

U.S. PATENT DOCUMENTS

| | | | | |
|---|---|---|---|---|
| 866,758 | A | * | 9/1907 | Wheeler et al. ................. 521/45 |
| 3,284,169 | A | * | 11/1966 | Tominaga et al. ............ 422/207 |
| 4,908,104 | A | * | 3/1990 | Loomans et al. ............... 201/25 |
| 5,780,518 | A | * | 7/1998 | Mulyarchik et al. ............ 521/45 |
| 7,832,343 | B2 | * | 11/2010 | Walker et al. ................. 110/229 |
| 7,833,512 | B2 | * | 11/2010 | Pulkrabek et al. ............ 423/650 |

* cited by examiner

*Primary Examiner* — Glenn Caldarola
*Assistant Examiner* — Randy Boyer
(74) *Attorney, Agent, or Firm* — Holland & Knight LLP; Brian J Colandreo, Esq.; Jeffrey T. Placker

(57) ABSTRACT

A continuous steam pyrolysis method is provided. The method comprises feeding a material to be pyrolyzed into a tubular reactor and carrying out a pyrolysis reaction in the tubular reactor in the presence of a superheated steam flow. The material to be pyrolyzed passes through one or more proceeding zones and one or more blending zones during the pyrolysis reaction in the tubular reactor. The total length of the one or more blending zones ranges about 5% to about 35% of the total length of the proceeding zones and the blending zones.

13 Claims, 3 Drawing Sheets

CONTINUOUS STEAM PYROLYSIS METHOD

CROSS-REFERENCE TO RELATED APPLICATIONS

This application claims priority to Taiwan Patent Application No. 097112505 filed on 7 Apr. 2008, the contents of which are incorporated herein by reference in its entirety.

BACKGROUND OF THE INVENTION

1. Field of the Invention

The present invention relates to a continuous steam pyrolysis method, and more particularly, relates to a continuous steam pyrolysis method for pyrolyzing waste tires with the use of superheated steam.

2. Descriptions of the Related Art

Waste tires are generally recycled using two methods. The first method is the physical processing method, in which the waste tires are broken up, then the steel wires, nylon and rubber are separated, and finally the rubber is recycled in the form of raw rubber. However, as a recycled material, the recycled rubber has poor quality and is inappropriate for use as a raw material to produce tires. The recycled rubber thus obtained has a low resource utilization factor and is less economical. The other processing method incorporates a chemical process, in which the waste tires are broken up after adding an appropriate percentage of catalyst. Then, the waste tires are pyrolyzed at an appropriate temperature and an appropriate pressure to produce gaseous products, blended oils, carbon black, residuals and the like. Then, with an appropriate separating process such as a fractionating process, the byproducts with high economical value such as light oil, gasoline, kerosene, diesel oil and heavy oil may be separated from the blended oils. Recycling waste tires are, thus, more efficient.

It can be seen from the above description that the pyrolysis method for processing waste tires delivers a substantially better recycling economical benefit. Therefore, most of the related development efforts under way at present are directed to such a method. Conventional waste tire pyrolysis technologies may further be divided into two categories, namely, pyrolysis-in-batch technologies and continuous-pyrolysis technologies. For the pyrolysis-in-batch technologies, waste tires are placed into a pyrolysis furnace which is then heated to activate a pyrolysis reaction. After completing the pyrolysis reaction, the processing procedures such as cooling and depressurizing are conducted and pyro-products are taken out. Thereafter, another batch of waste tires is placed into the furnace for processing. This approach is disadvantageous in that the pyrolysis furnace must be subjected to a heating/cooling cycle for each batch and the pyrolysis reaction has to be interrupted between the individual batches, resulting in a limited processing speed and a low production throughput. Furthermore, after processing each batch, the pyrolysis furnace has to be opened to take out the reaction products before the next batch of materials to be pyrolyzed can be loaded. This makes it difficult to effectively use gases resulting from the pyrolysis reaction, and tends to cause the escaping of dust and pyro-gases. Nowadays, waste tires are mostly processed through the continuous pyrolysis method to save time and cost, increase the production throughput and decrease hazard to the environment.

There are two types of continuous pyrolysis methods, one is continuous pyrolysis-in-batch method and the other is a continuous pyrolysis method. The continuous pyrolysis-in-batch method may use the apparatus disclosed in Taiwan Patent Publication No. 366304. This apparatus uses a plurality of pyrolysis furnaces in parallel, wherein each of them is controlled independently from each other, so that these parallel pyrolysis furnaces may be operated in sequence to accomplish a continuous pyrolysis. That is, when the pyrolysis reaction carried out in each pyrolysis furnace is completed, the pyrolysis furnace is cooled down independently, and then the pyro-products are withdrawn and a next batch is loaded. However, even though the pyrolysis reaction can be performed continuously according to such a continuous pyrolysis-in-batch method, each of the furnaces is still subjected to repeated heating and cooling, as well as the loading and unloading of the furnace. Furthermore, the individual operation of each furnace makes the method more complex. Moreover, such a continuous pyrolysis apparatus that uses a plurality of pyrolysis furnaces is necessarily huge and bulky in volume, and consequently limits its use in application.

Recently, continuous pyrolysis methods capable of achieving the continuous pyrolysis objective without the need of a plurality of parallel pyrolysis furnaces have been developed. An example of such methods can be accomplished by a continuous pyrolysis apparatus disclosed in Taiwan Patent Publication No. 361356. The apparatus comprises a vertically arranged stirrer, which has a stirring rod and an auger conveyor disposed thereon to assist in stirring, preheating, pyrolyzing the waste rubber and preventing occurrence of the bridging phenomenon. However, the method carried out with the use of this pyrolysis apparatus is a dry pyrolysis method which uses a dry gas, such as an inert gas, to carry the resultant pyro-gas out. When using a dry pyrolysis method, the pyrolysis furnace may explode due to a significant amount of combustible oil gases generated during the pyrolysis which is conducted at high temperature. Moreover, sulfurous component(s) contained in waste tires will be released during the pyrolysis of the waste tires. For a conventional pyrolysis technology using an inert gas as the carrier gas, the gaseous sulfurous component(s) will lead to a high sulfur content in the resultant pyro-products according to Henry's Law, and the quality of the products is thereby lowered.

In view of the disadvantages of conventional pyrolysis methods, a pyrolysis method is provided in the present invention, which allows for continuous pyrolysis without the need of a plurality of pyrolysis furnaces and can prevent blocking and bridging in the pyrolysis furnace. Furthermore, the pyrolysis method according to the invention allows for a continuous pyrolysis reaction and eliminates the complex operational procedures of heating up or cooling down the pyrolysis apparatus. Additionally, the method according to the invention is carried out in the presence of a steam flow, so that it can reduce the likelihood of explosion caused by combustible oil gases generated in the pyrolysis furnace, reduce the potential risks of the pyrolysis apparatus, and effectively dissolve the sulfurous component(s) into the steam and then carry the sulfurous component(s) out with the steam to reduce the sulfur content in the reaction products and the potential pollution extent on the environment.

SUMMARY OF THE INVENTION

One objective of this invention is to provide a continuous steam pyrolysis method which comprises the following steps: feeding a material to be pyrolyzed into a tubular reactor and carrying out a pyrolysis reaction in the tubular reactor in the presence of a superheated steam flow, wherein the material to be pyrolyzed passes through one or more proceeding zones and one or more blending zones during the pyrolysis reaction in the tubular reactor. The total length of the blending zones ranges from about 5% to about 35% of the total length of the proceeding zones and the blending zones.

The detailed technology and preferred embodiments implemented for the subject invention are described in the following paragraphs accompanying the appended drawings for people with ordinary skill in this field to well appreciate the features of the claimed invention.

DESCRIPTION OF THE PREFERRED EMBODIMENT

Figure 1:
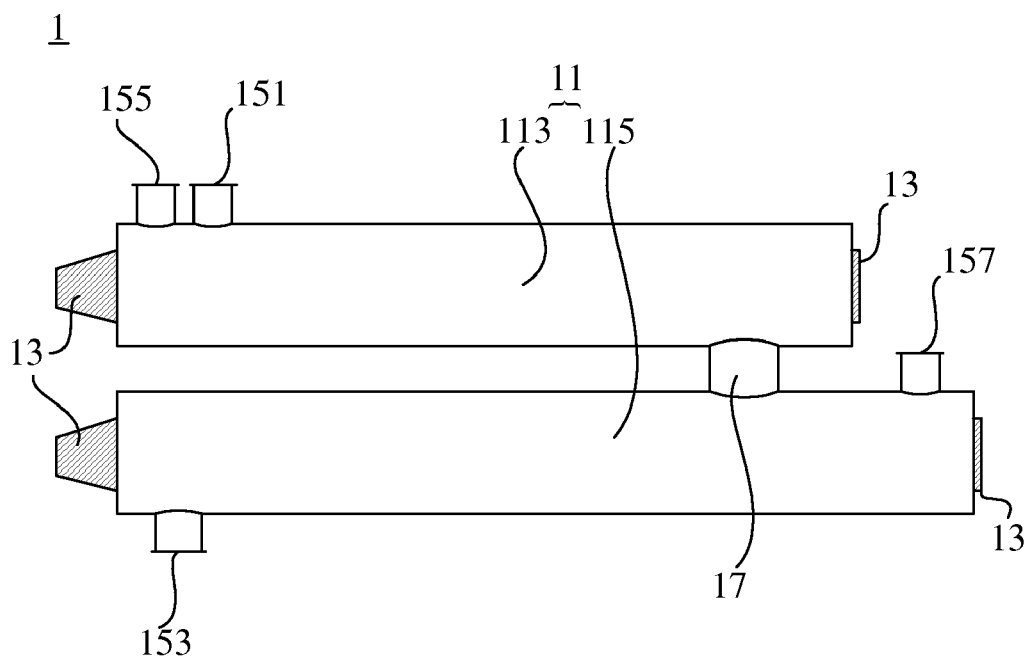
FIG. 1 is a side view of an embodiment of a pyrolysis furnace for implementing the method of the present invention.

This invention provides a continuous steam pyrolysis method which comprises the following steps: feeding a material to be pyrolyzed into a tubular reactor and carrying out a pyrolysis reaction in the tubular reactor in the presence of a superheated steam flow, wherein the material to be pyrolyzed passes through one or more proceeding zones and one or more blending zones in the tubular reactor. It has been found that, for the application of pyrolyzing waste tires, a too low proportion of the blending zones in the reactor makes it unable to achieve a desired stirring and blending effect. On the other hand, a too large proportion of the blending zones in the reactor makes the reactor to be blocked by twisted steel wires in the waste tires. For this reason, the total length of the blending zones is typically controlled to range from about 5% to about 35% of the total length of the proceeding zones and the blending zones. When pyrolyzing waste tires, the total length of the blending zones preferably ranges from about 10% to about 30% of the total length of the proceeding zones and the blending zones. The so-called "tubular reactor" generally refers to any appropriate reactors with one or more tube-like material receiving spaces therein.

In the conventional pyrolysis-in-batch method, the operation of the reactor must be suspended to open the reactor and take out the pyrolyzed products upon the completion of the pyrolysis reaction of each batch. This often leads to unsatisfactory production throughput, and is time and labor consuming. Furthermore, as previously described, the conventional pyrolysis-in-batch method also suffers from the problem of material leakage. In contrast, according to the method of this invention, the material to be pyrolyzed is moved forward gradually in the reactor during the pyrolysis reaction process, and by controlling the moving speed, the material to be pyrolyzed can stay in the reactor for a sufficient period of time to complete the desired pyrolysis reaction. Furthermore, non-gaseous products resulting from the pyrolysis reaction moves to the discharge opening and is discharged therefrom (gaseous pyro-products are discharged through an oil-gas outlet or also through the discharge opening continuously during the reaction) for subsequent processing. Hence, since it is unnecessary to open the reactor during the operation, the materials do not leak as in the conventional pyrolysis-in-batch method. Furthermore, the method of the present invention performs the pyrolysis continuously and delivers a remarkably improved efficiency and economic benefit. Moreover, in the method of the present invention, while moving forward in the reactor, the material to be pyrolyzed passes through one or more blending zones at proper times to be stirred therein, and thereby making the pyrolysis reaction more complete.

Since the pyrolysis reaction is carried out at a high temperature and a great amount of combustible oil-gases will be generated in the reaction, when accumulating to the lower limit of explosion (concentration) and a spark is produced unexpectedly, there will be a risk of explosion. The method of the present invention carries out the pyrolysis reaction in the presence of a steam flow and thus effectively reduces the likelihood of explosion of the pyrolysis apparatus. Additionally, the sulfurous components contained in waste tires will be released during the pyrolysis process. For a conventional pyrolysis technology using an inert gas as a carrier gas, according to Henry's law these gaseous sulfurous components would lead to a high sulfur content in the pyrolyzed products, causing the degraded quality of the resulting products. According to the method of the present invention, a superheated steam with a temperature of higher than 100° C. is used as a carrier gas of the pyrolysis reaction to dissolve parts of gaseous components (e.g., sulfurous components), resulted from the pyrolysis reaction, and then carry them out of the system, in addition to lowering the possibility of explosion. The content of impurities (e.g., sulfurous content) of the pyro-products is decreased and the economic value of the product is thereby increased.

Optionally, a pre-processing step can be performed prior to the pyrolysis reaction to reduce the size of the material to be pyrolyzed to improve the efficiency of the pyrolysis reaction. For example, a crushing or cutting process may be performed by means of a crusher or a cutting machine.

The material to be pyrolyzed with an appropriate size thus obtained is fed into the reactor in presence of a superheated steam flow. Here, the tubular reactor can be heated to a temperature necessary for the pyrolysis reaction by means of such as electric heating, fuel combustion, or heating with a high-temperature gas. In one embodiment, oil-gas recycled from the pyrolysis process can be used as at least a portion of the energy source for heating the reactor to provide the required temperature and to save the cost.

The superheated steam flow can be supplied by a superheated steam generator communicating with the reactor. Here, a superheated steam generator with a steam boiler can be used, wherein steam is generated in the steam boiler and then heated to form superheated steam at a high temperature. The steam can be heated in any appropriate manners, for example, by means of electric heating, fuel combustion, or a high-temperature gas. Alternatively, a superheated steam generator without a steam generating device may be used. In this case, in addition to communicating with the reactor, the superheated steam generator further communicates with an external steam source to heat the steam transferred therefrom to form superheated steam. In an embodiment of this invention, a tubular superheated steam generator surrounding the outer wall of the reactor is used. In this way, the superheated steam generator is simultaneously heated to supply superheated steam without the need of any additional heating devices while heating the reactor, and thus making more efficient use of energy Here, one end of the tubular structure is connected with the reactor and the other end thereof is connected with a steam source.

During the pyrolysis reaction, the fed material to be pyrolyzed preferably passes through a plurality of proceeding zones and a plurality of blending zones in the reactor so that the material to be pyrolyzed passes through the proceeding zones gradually but stays temporarily in the blending zones for blending. In an embodiment of this invention, the material to be pyrolyzed passes through a plurality of proceeding zones and a plurality of blending zones arranged alternately to make the pyrolysis reaction more complete and keep the reactor from being blocked by the material to be pyrolyzed. The resident time of the material to be pyrolyzed in each of the proceeding zones is substantially identical, while the resident time of the material to be pyrolyzed in each of the blending zones is also substantially identical.

Depending on the material to be pyrolyzed, various gaseous, liquid and/or solid products may be generated from the pyrolysis reaction. To effectively recycle these pyro-products, the continuous steam pyrolysis method of the present invention may optionally further comprise one or more separating procedures. For instance, when the method is used to treat waste tires, the pyro-products may include gaseous oil-gas products such as pyro-oils, combustible gases and water as well as solid-material products such as steel wires and carbon black. Hence, a pyro-oil-gas processing procedure and/or a pyro-solid-material processing procedure can be further included as the subsequent processes in the continuous steam pyrolysis method of this invention.

The pyro-oil-gas processing procedure is adopted to treat gaseous products from the reaction chamber, and may comprise a purifying step, a condensing step, a separating step and/or a waste water processing step. The purifying step is used to remove solid impurities (e.g., carbon black particles) that are possibly entrained in the oil-gas. The condensing step is used to cool down the pyro-oil-gas. The separating step is used to separate pyro-oils from the pyro-products, e.g., an oil-water separating step. The waste water processing step is used to treat the separated water. Of course, the pyro-oil-gas processing procedure may optionally comprise other separating steps.

The purifying step may be performed by a purifying device, which usually communicates with the reactor to remove dusts/particles (e.g., carbon black particles) possibly generated during the pyrolysis reaction. In an embodiment, a high-temperature filtering device with a pulse backwash capability is used as a purifying device. The high-temperature filtering device is usually provided with a filtering element (e.g., a metal mesh or a ceramic filter cartridge) to remove the dusts/particles. The principles and technologies of "pulse backwash" are well-known to those with ordinary skill in the art and thus will not be further described herein. The filtering performance of filtering devices without the backwash capability, such as a powerful downdraft filtering device, usually degrades with continued operation of the devices. This is because the mesh is blocked by particles or dusts filtered out from the gases. In contrast, the filtering device with the backwash capability used in the present invention may avoid the blocking phenomenon effectively to ensure a continuous reaction. When a filtering device with the pulse backwash capability is used, superheated steam may be introduced into the high-temperature filtering device intermittently. Alternatively, combustible gases obtained from the pyro-oil-gas separating process may be fed back into the high-temperature filtering device to accomplish the pulse backwash action and to maintain a desired flow rate across the mesh.

The condensing step cools down the gaseous components of the pyro-products to separate the pyro-products into pyro-oil, water, combustible gases and the like by means of a condensing effect. The condensing step may be accomplished by any appropriate condensing devices. Generally, one or more condensers connected in series are used to separate the pyro-products into a plurality of components for subsequent use. In an embodiment, a condensing device consisting of two condensers connected in series is used, and the condensing step is arranged subsequent to the purifying step. This will ensure that the particles and dusts contained in the gaseous components are filtered out in the purifying step instead of entering the condensing device, which would otherwise cause blocking of the apparatus or affect the economic value of the separated products.

At higher condensing temperatures, oils tend to be condensed and separated at first during the condensation of the pyro-oil-gas. To prevent the condenser from being blocked on account of the high viscosity of the condensed oils, a condenser with a U-type pipeline is preferably used at the front end of the condensing device, so that the cooling water passes within the pipeline and the gaseous components to be condensed passes through the outer side of the U-type pipeline. In this way, the pyro-oils will condense on the outer wall of the U-type tube and drip naturally and be transferred to the outside. Compared to conventional condensing approaches in which the material to be condensed passes within the pipeline while the cooling water passes outside the pipeline, this can effectively prevent possible blocking by oils and ensure the pyrolysis reaction to be carried out continuously.

The pyro-solid-material processing procedure may optionally comprise various appropriate physically/chemically separating procedures. Generally, the pyro-solid-material processing procedure comprises a separating step (e.g., a sorting step or a magnetic separating step) and a crushing step (e.g., a grinding step) for further processing the solid pyro-products. When treating waste tires, for example, the pyro-solid-material processing procedure may comprise a sorting step, a magnetic separating step and a grinding step. The sorting step is used to preliminarily remove steel wires in the waste tires from the solid products resulting from the pyrolysis reaction, which may be accomplished by a sorting machine communicating with the reactor. The solid pyro-products that have been treated to preliminarily remove steel wires are preliminarily removed and then subjected to a magnetic separating step to further separate the residual steel wires and, optionally, other metal substances. Finally, a grinding step is optionally carried out to grind the final products into the desired particle size for recycling. Additionally, subsequent to the grinding step, a sorting procedure may be optionally carried out to further sort the ground products.

The continuous steam pyrolysis method of the present invention may be used to pyrolyze various materials such as waste tires, waste plastics, waste wood, or agricultural biomass, and is preferably used to treat waste tires.

To explain this invention more clearly, an exemplary embodiment of the continuous steam pyrolysis method of the present is described hereinafter with reference to the attached drawings. In the attached drawings, the dimensions of individual elements are only provided for reference, but not for reflecting the actual dimensional scale.

Figure 2:
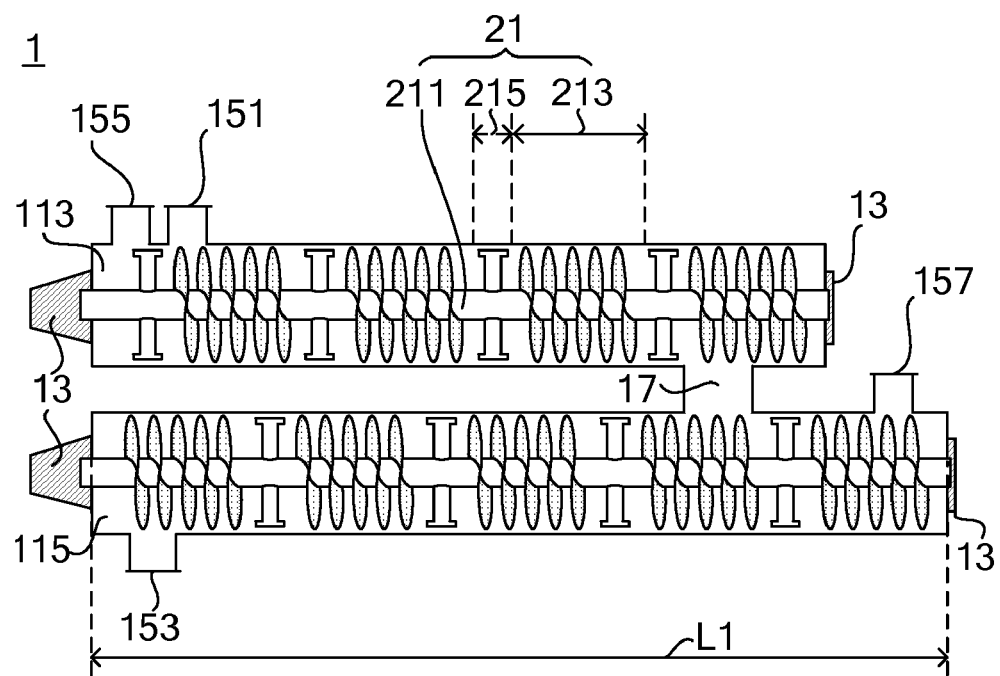
FIG. 2 is a cross-sectional view of an embodiment of a pyrolysis furnace for implementing the method of the present invention.
Figure 3:
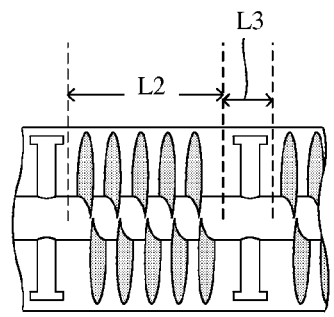
FIG. 3 is a partially enlarged view of the pyrolysis furnace of FIG. 2.

FIG. 1 illustrates a pyrolysis furnace 1. The pyrolysis furnace 1 comprises a reaction chamber 11, a driving device 13, a charge opening 151, a discharge opening 153, a pyro-oil-gas outlet 155, a secondary-refining inlet 157, and a communicating opening 17. The reaction chamber 11, which can function as a reactor for carrying out the method of the present invention, comprises a first reaction region 113 and a second reaction region 115 installed one above the other which communicate with each other through the communicating opening 17. FIG. 2 illustrates a cross-sectional view of the pyrolysis furnace 1 shown in FIG. 1. Each of the first and second reaction regions 113, 115 of the reaction chamber 11 is provided with one axial transporting structure 21 therein, and each of the axial transporting structures 21 is connected to a corresponding driving device 13. Each of the transporting structures 21 has a central axis 211 and comprises a plurality of spiral segments 213 and a plurality of paddle segments 215. FIG. 3 depicts a partially enlarged view of the first and the second reaction regions 113, 115, where L2 represents the length of one spiral segment and L3 represents the length of one paddle segment. The total lengths of the spiral segments 213 and the paddle segments 215 are respectively calculated by summing the length of each segment occupied along the direction of the central axis 211. Generally, the total length (L3) of the paddle segments of one transporting structure 21 is controlled to range from about 5% to about 35% of the length of the transporting structure 21.

Waste tires are fed through the charge opening 151 into the reaction chamber 11 and pyrolyzed therein. The pyro-oil-gas resulting from the pyrolysis reaction is fed out through the pyro-oil-gas outlet 155, while pyro-solid-material products are fed out through the discharge opening 153. The waste tires are firstly fed into the first reaction region 113 of the reaction chamber 11 and gradually moved forward (i.e., providing a proceeding zone in the method of this invention) along the central axis of the transporting structure 21 during the pyrolysis reaction by the rotating transporting structure 21. In this course, the waste tires stay temporarily in the paddle segments 215 to be stirred and blended by the rotating paddles of the paddle segments (i.e., providing a blending zone in the method of this invention). Because the first and the second reaction regions 113, 115 are installed one above the other, the waste tires under the pyrolysis reaction will drop into the second reaction region 115 when reaching the communicating opening 17 and then, with the rotation of the transporting structure 21 of the second reaction region 115, move forward to proceed with the pyrolysis reaction. The pyro-solid-material products are fed out through the discharge opening 153, while the pyro-oil-gas resulting from the pyrolysis reaction is fed out through the pyro-oil-gas outlet 155.

Figure 4:
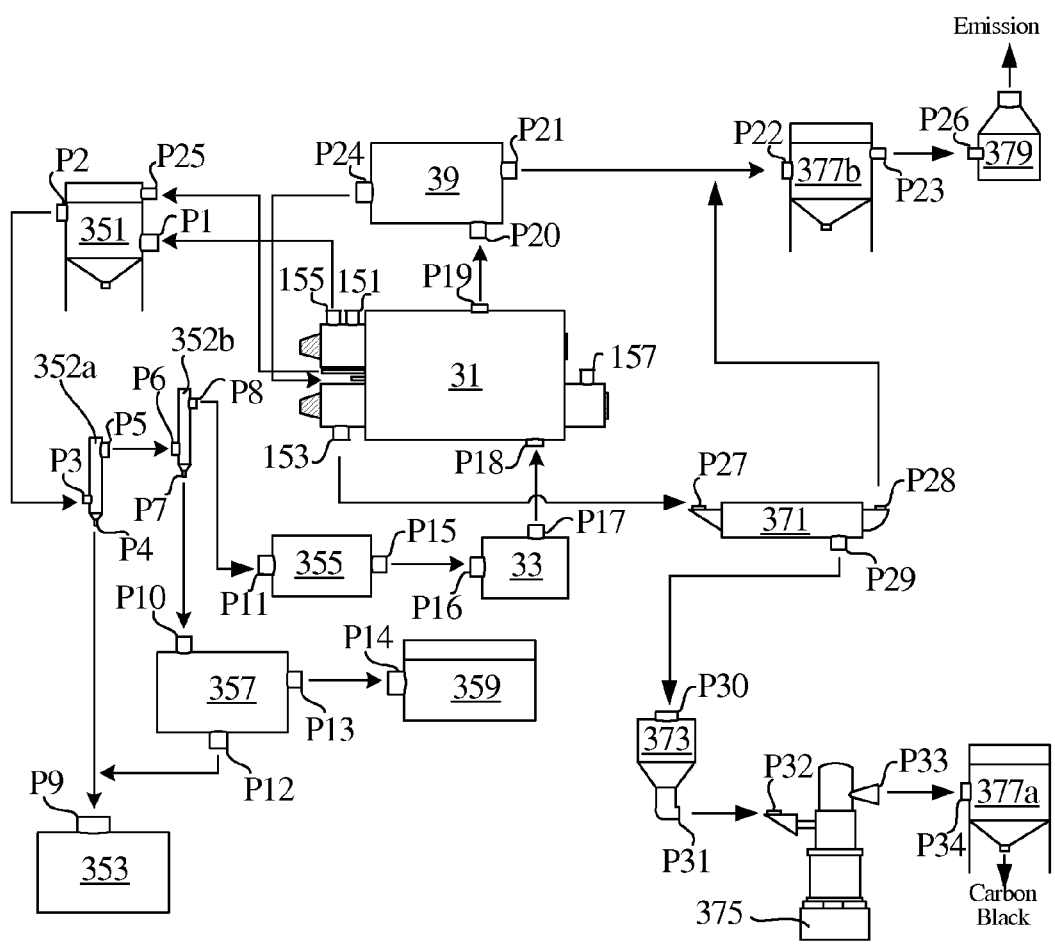
FIG. 4 is a schematic view of a continuous steam pyrolysis apparatus for implementing the method of the present invention.
Figure 5:
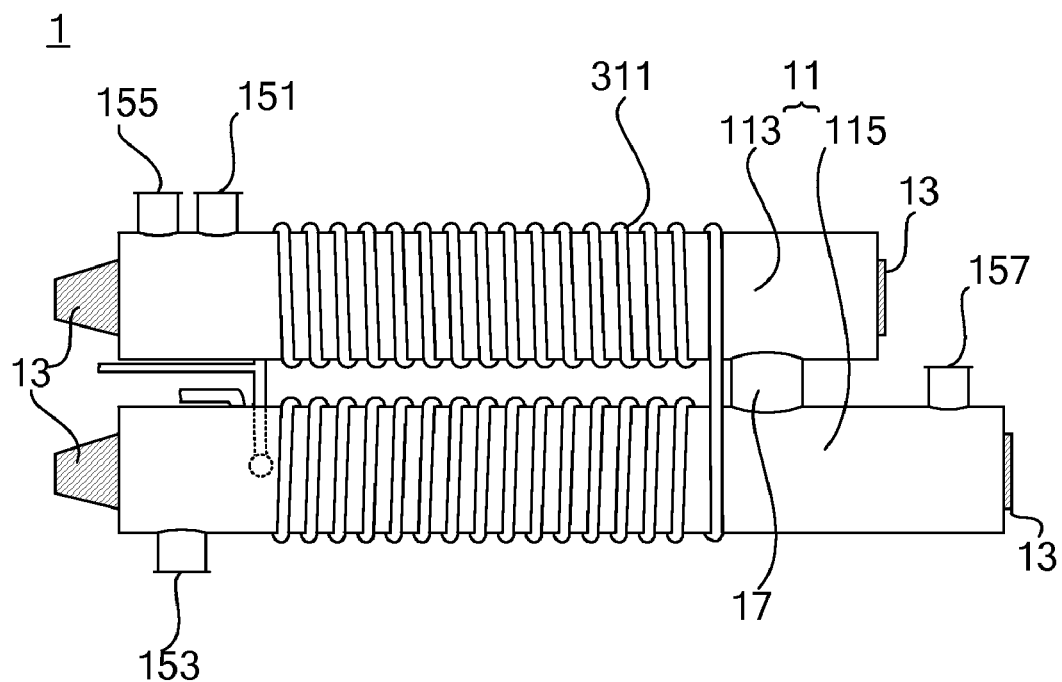
FIG. 5 is a side view of a superheated steam generator and a pyrolysis furnace in a continuous steam pyrolysis apparatus for implementing the method of the present invention.

FIG. 4 illustrates the arrangement of an apparatus for implementing an embodiment of a continuous steam pyrolysis method of the present invention. The apparatus primarily comprises a combustion chamber 31, a combustion furnace 33 and a steam boiler 39. As shown in FIG. 5, the pyrolysis furnace 1 as shown in FIG. 1 is disposed in the combustion chamber 31, while a tubular superheated steam generator 311 surrounds the reaction chamber 11 of the pyrolysis furnace 1. Additionally, the apparatus comprises a pyro-oil-gas processing system for implementing the pyro-oil-gas processing procedure and a pyro-solid-material processing system for implementing the pyro-solid-material processing procedure.

As shown in FIG. 4, the pyro-oil-gas processing system for implementing the pyro-oil-gas processing procedure comprises a high-temperature filtering device 351, a condensing device consisted of a first and a second condenser 352a, 352b, an oil-water separating tank 357, a gas stabilizing tank 355 and a waste water processing device 359.

The combustion chamber 31 has a pyro-oil-gas outlet 155 and a first hot air outlet P19, wherein the outlet 155 communicates with the pyro-oil-gas inlet P1 of the high-temperature filtering device 351 and the outlet P19 communicates with the second hot air inlet P20 of the steam boiler 39. In addition to the pyro-oil-gas inlet P1, the high-temperature filtering device 351 further comprises an oil-gas outlet P2 and a backwash air inlet P25, wherein the outlet P2 communicates with a first condensation inlet P3 of the first condenser 352a and the inlet P25 of this embodiment is adapted to introduce superheated steam generated by the superheated steam generator 311 into the high-temperature filtering device 351. In addition to the first condensation inlet P3, the first condenser 352a further comprises a first liquid inlet P4 and a first air outlet P5 to communicate with the oil tank opening P9 of the oil tank 353 and second condensation inlet P6 of a second condenser 352b respectively. In addition to the second condensation inlet P6, the second condenser 352b further comprises a second liquid outlet P7 and a second gas outlet P8 to communicate with the second liquid inlet P10 of the oil-gas separating tank 357 and second gas inlet P11 of a gas stabilizing tank 355 respectively. In addition to the second gas inlet P11, the gas stabilizing tank 355 further comprises a combustible gas outlet P15 communicating with a fuel inlet P16 of the combustion furnace 33. Optionally, the outlet P15 may further communicate with the backwash gas inlet P25 (not shown).

In addition to the fuel inlet P16, the combustion furnace 33 further comprises an air outlet P17 communicating with the first hot air inlet P18 of the combustion chamber 31. In addition to the second liquid inlet P10, the oil-water separating tank 357 further comprises an oil outlet P12 and a water outlet P13, which communicate with the oil tank opening P9 of the oil tank 353 and the waste water inlet P14 of the waste water processing device 359 respectively.

As shown in FIG. 4, the pyro-solid-material processing system for implementing the pyro-solid-material processing procedure comprises a sorting machine 371, a magnetic separator 373, a first bag-type collector 377a and a second bag-type collector 377b. The sorting machine 371 comprises a primary processing inlet P27, a primary process gas outlet P28 and a primary solid product outlet P29. The inlet P27 communicates with the discharge opening 153 of the reaction chamber 11 to receive solid-material products generated in the reactor 11, and communicates with the hot air inlet P22 of the second bag collector 377b and a secondary processing inlet P30 of the magnetic separator 373 via the outlets P28 and P29 respectively. The magnetic separator 373 further comprises a secondary processing outlet P31 that communicates with a tertiary processing inlet P32 of the grinding machine 375. The grinding machine 375 further communicates with the filtering inlet P34 of the first bag-type collector 377a via a tertiary processing outlet P33.

In addition to the third hot air inlet P22, the second bag-type collector 377b further comprises a third hot air outlet P23 communicating with the waste gas inlet P26 of a waste gas processing device 379. Meanwhile, the steam boiler 39 communicates with the third hot air inlet P22 of the second bag-type collector 377b via a second hot air outlet P21 and communicates with the superheated steam generator 311 via a steam outlet P24.

Hereinafter, we will explain how to use the steam pyrolysis apparatus illustrated above to carry out the method of the present invention to treat waste tires.

Initially, prior to the pyrolysis process, a pre-processing step is performed on the waste tires by using a pre-processing device such as a crusher or a cutting machine to pre-process the waste tires into the appropriate size. Then, the waste tire granules with the appropriate size (usually cut into a particle size ranging from about 5 cm to about 7 cm) are fed into the reaction chamber 11 of the pyrolysis furnace 1 via the charge opening 151 with a speed of about 1000 kg/hour. At this point, the temperature outside the pyrolysis furnace 1 is kept between about 700° C. and about 1000° C. to heat the superheated steam generator 311 and to keep the temperature of the reaction chamber 11 between about 350° C. and about 550° C., preferably between about 350° C. and about 480° C. Meanwhile, the superheated steam generated by the superheated steam generator 311 is introduced into the reaction chamber 11 to participate in the pyrolysis reaction.

Figure 6:
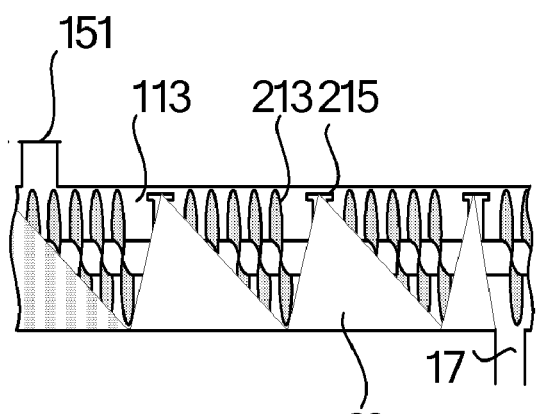
FIG. 6 is a schematic view illustrating how materials pass through a pyrolysis furnace for implementing the method of the present invention.

The waste tire granules are transported by the transporting structure 21 and pass through the proceeding zones and the blending zones alternately (i.e., pass through the spiral segments 213 and the paddle segments 215 alternately) in the reaction chamber 11 to be pyrolyzed completely. FIG. 6 illustrates that way that the material 22 to be pyrolyzed (e.g., waste tire granules) passes through the first reaction region 113 of the reaction chamber 11. More specifically, the material 22 moves forward in one spiral segment 213 and accumulates gradually, and is then stirred and blended upon reaching one paddle segment 215, after which the material 22 gradually falls into the next spiral segment 213 and keeps moving forward. When the material is transported to the end of the first reaction region 113, a residual carbon black mixture and un-pyrolyzed waste tire granules fall into the second reaction region 115 via the communicating opening 17 to proceed with the pyrolysis. The material passes through the second reaction region 115 in substantially the same way as that in the first reaction region 113. During the pyrolysis reaction, the oil-gas resulting from the pyrolysis is transported to the pyro-oil-gas processing system. The non-gaseous pyro-products are either transported to the pyro-solid-material processing system or, optionally, fed into the second reaction region 115 via the secondary refining inlet 157 for secondary refining. In more detail, the pyro-oil-gas flows into the high-temperature filtering device 351 which may have a pulse backwash capability, where carbon black particles therein are removed through, for example, a high-temperature steam pulse backwash process. Generally speaking, the high-temperature filtering device 351 equipped with a porous ceramic cartridge or a metal mesh may be employed, wherein the operation temperature is controlled to range from about 280° C. to about 450° C. and the filtering rate is controlled to range from 1 cm/second to 3 cm/second.

Subsequently, the pyro-oil-gas that the carbon black has been removed is subjected to a condensing process, which usually has two stages. In particular, as shown in FIG. 4, the pyro-oil-gas is introduced into the first condenser 352*a* first to cool down the pyro-oil-gas to a temperature of about 110° C. The condensed oils thus obtained may be further processed in a subsequent process for recycling, and the residual pyro-oil-gas proceeds to the second condenser 352*b* where it is cooled down to a temperature of about 40° C. The condensed oils thus separated may also be processed in the subsequent process for recycling, and the condensed water is optionally subjected to a waste water treatment process for recycling or disposal. Also, the condensed pyro-gases may be optionally subjected to a gas stabilizing process, and then fed into the combustion furnace 33 to further supply necessary heat for use in the method of this invention.

In the case of pyrolysis waste tires, the material to be pyrolyzed usually comprises metal pieces such as steel wires. Therefore a sorting step may be carried out at first on the pyro-products resulting from the reaction. For example, non-gaseous pyro-materials from the pyrolysis may be transported to the sorting machine 371 to preliminarily remove the steel wires and carbon black and cool down the pyro-solid material (generally cooled down to a temperature lower than 100° C.). In this step, the residual gaseous components in the pyro-materials are fed into the second bag-type collector 377*b* to remove carbon black particles, and are subsequently treated by the waste gas processing device 379 for emission. The pyro-solid materials with the steel wires being removed preliminarily are subsequently transported to the magnetic separator 373 to further remove the steel wires and carbon black. The collected carbon black is subsequently ground to the desired particle size. Usually, the carbon black is ground to a particle size capable of passing through a screen sized 200 mesh to be recycled.

In this embodiment, the diesel or fuel oil is used as a fuel of the combustion furnace 33 at an early stage of the operation, and upon commencement of the pyrolysis reaction, the combustible gases resulting from the pyrolysis reaction may be used as a fuel to reduce the cost. Here, the fuel has a flow rate of about 80 liters/hour. A high-temperature gas generated by the combustion furnace 33 is introduced into the combustion chamber 31 through, for example, fan drafting. The high-temperature gas maintains the temperature inside the combustion chamber 31 within a range of about 700° C. to about 1000° C., and heats the pyrolysis furnace 1 and the superheated steam generator 311 to obtain the temperature necessary for the pyrolysis reaction (about 350° C. to about 550° C.) in the reaction chamber 11 of the pyrolysis furnace 1. The high-temperature gas within the combustion chamber 31 may then be transferred to the steam boiler 39 to heat water into steam. In this respect, this invention does not preclude the use of a steam boiler 39 equipped with a combustor in itself. In other words, the steam boiler 39 may be heated by the high-temperature gas from the combustion chamber 31, the hot air generated in the combustion furnace 33, and/or the other combustor equipped in the steam boiler 39 itself to generate steam. Likewise, the combustor in the steam boiler 39 may also utilize combustible gases resulting from the pyrolysis reaction as a fuel to reduce the costs.

On the other hand, steam generated in the steam boiler 39 is used in the superheated steam generator 311 to generate superheated steam, and may also be used in the high-temperature filtering device 351 to execute a steam pulse backwash process to remove the undesired particles. In more detail, a portion of the steam generated in the steam boiler 39 is transferred to the superheated steam generator 311 via the steam outlet P24, and then flows forward in the superheated steam generator 311 where it is heated by the high-temperature gas in the combustion chamber 31 to finally form superheated steam. A portion of the superheated steam is introduced into the reaction chamber 11 for use as a carrier gas in the pyrolysis reaction, while another portion of the superheated steam is introduced into the high-temperature filtering device 351 via the backwash gas inlet P25 for pulse backwashing on a regular or irregular basis to effectively prevent the blocking of the device. Here, as previously described, the stabilized combustible gases from the gas stabilizing tank 355 may also be fed into the high-temperature filtering device 351 via the backwash gas inlet P25 to conduct a pulse backwash process. Accordingly, the superheated steam and combustible gases may be used in combination depending on the arrangement and conditions of energy sources/materials in the whole apparatus. For example, the superheated steam from the superheated steam generator 311 and the combustible gases from the gas stabilizing tank 355 may be used alternately.

In summary, the method of the present invention is unique in that the material to be pyrolyzed passes through one or more proceeding zones and one or more blending zones, and the total length of the blending zones ranges from about 5% to about 35% of the total length of the proceeding zones and the blending zones. This percentage, a result obtained from numerous tests by the inventors, not only prevents incomplete pyrolysis due to insufficient stirring as in conventional pyrolysis-in-batch methods, but also allows the material to be transferred forward within and finally out of the reactor actively through the disposition of the proceeding zones to ensure continuous occurrence of the pyrolysis reaction and improve efficiency.

Furthermore, in addition to the use of the aforesaid pyrolysis furnace, the continuous steam pyrolysis method of the present invention may further comprise a purifying step and/or a condensing step. The purifying step is adapted to remove particles (e.g., carbon black particles) from the pyro-gases, which helps to improve the quality of resultant oils, prevent blocking of a condensing device at the downstream thereof, and reduce the cost of a subsequent oil refining process. Also, the particles (e.g., carbon black particles) thus collected deliver better economic outcomes. Moreover, by using a condenser with a U-type pipeline therein in the condensing step, the cooling water flows within the pipeline and the pyro-oil-gas flows along the outer side of the pipeline, so the blocking phenomenon is effectively avoided.

Furthermore, the continuous steam pyrolysis method of this invention utilizes superheated steam as a carrier gas. This, on one hand, can prevent explosion which would likely occur in conventional dry-type cracking processes. On the other hand, the sulfur content in the pyro-products can be decreased to ensure a better economic value thereof.

Due to these advantages, the method of the present invention is capable of pyrolyzing materials, especially waste tires, efficiently on a continuous basis. The products thus obtained also have better economic values.

The above disclosure is related to the detailed technical contents and inventive features thereof. People with ordinary skill in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A continuous steam pyrolysis method, comprising feeding a material to be pyrolyzed into a tubular reactor and carrying out a pyrolysis reaction in the tubular reactor in the presence of a superheated steam flow; and performing a pyro-solid-material processing procedure to solid products of the pyrolysis reaction, wherein the material to be pyrolyzed passes through one or more proceeding zones and one or more blending zones during the pyrolysis reaction in the tubular reactor and the total length of the blending zones ranges from about 5% to about 35% of the total length of the proceeding zones and the blending zones and the pyro-solid-material processing procedure includes a sorting step, a magnetic separating step, and optional, a grinding step.

2. The method as claimed in claim 1, wherein the total length of the blending zones ranges from about 10% to about 30% of the total length of the proceeding zones and the blending zones.

3. The method as claimed in claim 1, which further comprises:
   providing a steam;
   heating the steam to form the superheated steam flow; and
   introducing the superheated steam flow into the tubular reactor.

4. The method as claimed in claim 1, which further comprises performing a pre-processing step for the material to be pyrolyzed before feeding the material to be pyrolyzed into the tubular reactor.

5. The method as claimed in claim 1, wherein the material to be pyrolyzed passes through a plurality of proceeding zones and a plurality of blending zones alternately arranged with each other in the tubular reactor during the pyrolysis reaction; and the resident time of the material to be pyrolyzed in each of the proceeding zones is substantially identical and the resident time of the material to be pyrolyzed in each of the blending zones is substantially identical.

6. The method as claimed in claim 1, wherein the material to be pyrolyzed passes through one or more spiral segments as the proceeding zone(s) and one or more paddle segments as blending zone(s) during the pyrolysis reaction in the tubular reactor.

7. The method as claimed in claim 6, wherein the material to be pyrolyzed passes through a plurality of spiral segments and a plurality of paddle segments alternately arranged in the tubular reactor during the pyrolysis reaction; and the resident time of the material to be pyrolyzed in each of the spiral segments is substantially identical and the resident time of the material to be pyrolyzed in each of the paddle segments is substantially identical.

8. The method as claimed in claim 1, wherein the tubular reactor is kept at a required temperature by means of a high-temperature gas.

9. The method as claimed in claim 1, which further comprises performing a pyro-oil-gas processing procedure for gaseous products of the pyrolysis reaction, wherein the pyro-oil-gas processing procedure includes a purifying step, a condensing step, and optional, an oil-water separating step and/or a waste water processing step, and the purifying step is a high-temperature filtering step.

10. The method as claimed in claim 9, which comprises sending at least a portion of the superheated steam flow into the high-temperature filtering step.

11. The method as claimed in claim 9, which comprises sending at least a portion of gases obtained from the condensing step into the high-temperature filtering step.

12. The method as claimed in claim 1, wherein waste tires are fed into the tubular reactor for pyrolysis reaction, carried out at a temperature ranging from about 350° C. to about 550° C.

13. The method as claimed in claim 12, wherein the waste tires have a diameter ranging from about 5 cm to about 7 cm and the pyrolysis reaction is carried out at a temperature ranging from about 350° C. to about 480° C.

* * * * *